United States Patent [19]
Ward, III et al.

[11] Patent Number: 5,057,160
[45] Date of Patent: Oct. 15, 1991

[54] APPARATUS FOR PASSIVELY RELEASING GASES FROM A VESSEL AGAINST AN ADVERSE PRESSURE GRADIENT

[75] Inventors: William J. Ward, III; Philip G. Kosky, both of Schenectady, N.Y.; John A. Kamal, Philadelphia, Pa.

[73] Assignee: General Electric Company, Schenectady, N.Y.

[21] Appl. No.: 401,730

[22] Filed: Aug. 31, 1989

[51] Int. Cl.$^5$ .............................. H01L 37/00
[52] U.S. Cl. .................... 136/202; 376/456; 429/82; 429/89
[58] Field of Search ............ 376/456, 327, 317; 429/82, 89; 310/301; 136/202

[56] References Cited

U.S. PATENT DOCUMENTS

| | | | |
|---|---|---|---|
| 3,268,745 | 8/1966 | Schalliol | 310/4 |
| 3,578,442 | 5/1971 | Anderson | 75/206 |
| 3,697,377 | 10/1972 | Gauthron | 176/79 |
| 3,723,742 | 3/1973 | Aranguren et al. | 250/106 |
| 3,767,930 | 10/1973 | Sayell | 250/493 |
| 3,892,626 | 7/1975 | Hirose | 176/68 |

FOREIGN PATENT DOCUMENTS

747033  8/1970  Belgium .

OTHER PUBLICATIONS

Perry, John H., *Chemical Engineers' Handbook*, 4th Ed., McGraw-Hill Book Co., New York, N.Y., 1963, pp. 17-33.

*Primary Examiner*—Brooks H. Hunt
*Assistant Examiner*—Chrisman D. Carroll
*Attorney, Agent, or Firm*—William H. Pittman; James C. Davis, Jr.

[57] ABSTRACT

A microporous plug is provided which serves to seal a vessel so as to prevent the bulk flow of gases through an outlet. The pores of said microporous plug are sized so as to permit the transport of gases to and from the vessel interior by Knudsen diffusion. In preferred embodiments, the pores of the plug are sized so as to release helium from the interior of a vessel and restrict the transport of carbon dioxide into the vessel from the surrounding atmosphere by Knudsen diffusion. Such embodiments are particularly useful on Mars where the helium is transported into an environment of higher pressure. In other embodiments, the microporous plug is used in conjunction with an absorber positioned within the vessel to react with atmospheric gases that pass through the plug, such as carbon dioxide. Also provided are radioisotope thermoelectric generators that incorporate a microporous plug and optionally an absorber.

12 Claims, 2 Drawing Sheets

APPARATUS FOR PASSIVELY RELEASING GASES FROM A VESSEL AGAINST AN ADVERSE PRESSURE GRADIENT

This invention is directed to an apparatus which releases gases from a vessel by Knudsen diffusion. More particularly, this invention is directed to an apparatus which releases gases from an extraterrestrial vessel. Examples of such a vessel include radioisotope thermoelectric generators (RTGs) within spacecraft. The apparatus utilizes a microporous plug which allows gases such as helium to be transported by Knudsen diffusion from a vessel maintained at low pressure while restricting the inflow of atmospheric gases at higher pressure, as on the surface of Mars.

When selecting and designing equipment for use in space, important considerations include equipment size, mass, performance and durability. Although there are fewer physical restrictions on equipment size and mass with the advent of the Space Shuttle, the present cost of launching a space probe or satellite is approximately $5000/lb. and therefore, these four features are critical to a successful design.

In supplying the electric power needs aboard a spacecraft, radioisotope thermoelectric generators (RTGs) have been found to be excellent candidates in satisfying these criteria. RTGs have been used on a number of space missions, most frequently on missions in deep space. These devices are small in size and mass and have proven to be reliable in generating low power over extended periods. Some examples of space missions where an RTG has been employed include the Apollo, Pioneer, Viking (Mars surface probe), Voyager, and Galileo missions. RTGs are an excellent alternative to solar arrays which perform poorly in deep space because of the low intensity of sunlight.

While an RTG uses a radioisotope as fuel, it generates power by a method distinct from that of conventional nuclear power plants on Earth. An RTG produces electric power directly from the heat generated from the radioactive decay of a radioisotope by the use of thermoelectric couplings or elements. Unlike the nuclear fission reactions within boiling water reactors, the heat generated within the RTG is not used to produce steam or other mobile working fluid to drive a turbine. For the RTG to function, the radioisotope need only be positioned in proximity to an array of thermoelectric couples or elements.

The fuel and thermoelectric couples are enclosed in a vessel to protect against oxidation and harmful radiation, particularly during launch. Heat rejection fins are typically positioned about the vessel to prevent the accumulation of excess heat in critical components.

The half life of plutonium 238 (about 86.4 years) makes it an excellent fuel in the construction of light, compact and reliable RTGs for use in space. Plutonium 238 emits high-energy alpha particles (helium atoms) of about 5.5 MeV. during decay and with such a short half life, the isotope provides a favorable power to weight ratio of about 0.57 watts per gram and a high specific activity of 17 Ci./g.

The configuration and components of the RTGs used in space have been modified a number of times to conform to the needs of the mission. A detailed history of the development of RTGs is given by Bennet et al. in their paper "U.S. Radioisotope Thermoelectric Generator Space Operating Experience", 18th conference of the IECEC, Aug. 1983; the contents of which are incorporated herein by reference.

In the early missions, the RTGs were referred to as S.N.A.P.s (Systems for Nuclear Auxiliary Power). They were comprised of sintered lead-telluride thermoelectric couples placed between plutonium 238 metal fuel and the walls of a protective housing. The Voyager mission required higher power outputs from a device referred to as an "MHW-RTG" (Multihundred-Watt RTG). Silicon-germanium thermoelectric couples were used in response to these needs and the fuel used was plutonium 238 oxide. While the fuel and thermocouples were changed, it was still necessary to position these components in a protective housing, as is the case with two recent RTG designs, the GPHS-RTG (General Purpose Heat Source-RTG) and the MOD-RTG (Modular Segment-RTG).

The need to house these components poses problems due to the helium generated from the decay of plutonium 238 over extended operation of the RTG. Helium is highly thermally conductive and provides a low resistance path for heat to flow to the housing surface where it is radiated to space. As the concentration of helium within the protective housing of the RTG increases, less heat energy is conducted through the thermocouples and power output diminishes.

For orbiting spacecraft, the helium produced may simply be released into the vacuum of space. The MHW-RTG's used on the Voyager missions and the GPHS-RTG used on the Galileo mission incorporated a mechanical pressure relief device in the vessel to accomplish this purpose. The RTG used in the exploration of the Martian surface (Viking) could not incorporate such a valve since carbon dioxide in the Martian atmosphere would flood the interior of the RTG upon opening. A vacuum pump to vent the helium is undesirable because of weight and reliability considerations. To accommodate the increasing helium pressure, the vessel was enlarged and filled with argon to prevent the inflow of atmospheric oxygen before launch. The increase in the RTG's internal volume served to dilute the helium produced and reduce the power lost.

In that minimization of equipment size and mass is extremely important, providing space within the vessel for the helium produced is not an ideal solution to this problem, particularly as future missions will require larger RTGs with longer operating lifetimes. Applicants have provided a solution wherein the helium can be released passively from the vessel into an atmosphere of higher pressure while the contents of the containment vessel are protected from the inflow of the surrounding gases. The system of the present invention relies on a particular transport process known as Knudsen diffusion to effectively release helium without introducing undesirably large amounts of gases from the surrounding atmosphere. The output from an RTG can be increased and its useful life extended by utilizing the present invention.

Knudsen diffusion has been employed in gas phase separation processes wherein the separation effect depends upon the flow of a process gas mixture through extremely small holes in a barrier or membrane. When the diameter of these holes is approximately the same or less than the mean free path of the process gas molecules, individual molecules pass through the barrier by Knudsen diffusion but bulk flow (convective flow) of the gas is effectively prevented. Since at a given temperature, lighter molecules move with greater velocity than heavy molecules, the former will pass through the barrier preferentially. Where the holes are larger than the mean free path of the molecules, bulk or convective flow, which is non-selective, takes place. A large-scale application of Knudsen diffusion is the separation of the isotopes of uranium 235 and uranium 238 where over 10,000 separation stages are used to obtain enriched uranium 235.

Porous barriers have been used to isolate the helium generated from the radioactive fuels used in boiling water reactors on Earth. Although the generation of helium in such systems does not significantly detract from the process efficiency and can be accounted for by simply providing a vapor space within the fuel rods, there have been disclosures wherein the gaseous products are diffused through a porous membrane into the reactor coolant. Examples are U.S. Pat. No. 3,892,626, in which a porous membrane of sintered stainless steel having pores of an average diameter of approximately 5 microns can be used to release helium into an inert liquid, which subsequently diffuses into the coolant; and Belgian Patent 747,033, in which it is said the helium generated from radioactive decay is released into the coolant through a sintered nickel filter with a pore size of 1000 angstrom units. However, these methods do not employ Knudsen diffusion and are not adaptable to environments such as that on Mars.

Applicants have provided an apparatus for releasing gases from an extraterrestrial vessel containing an RTG. The apparatus comprises a microporous plug which, when positioned in an outlet of the vessel, restricts the convective flow of gases. The pores of the plug are of a size which permits gases such as helium to be transported out of the vessel interior by Knudsen diffusion. The plug will permit the transport of gases from the vessel interior to an atmosphere of higher total pressure.

In certain preferred embodiments, the microporous plug is adapted to provide a flow of helium out of the vessel at a rate of about $10^{-7}$ to $10^{-10}$ moles per second and maintain a helium pressure of about 1 millibar and a temperature of about 250° C. Such an apparatus will release a substantial portion of the helium generated by present RTGs.

The apparatus of this invention will release gases from a vessel without exposing its contents to significant quantities of atmospheric gases, even when said atmospheric gases are at higher pressures, by substantially preventing the convective flow of any atmospheric gases therein. A small quantity of the atmospheric gases will pass through the microporous plug by Knudsen diffusion which will not interfere with the exit of helium by Knudsen diffusion. In preferred embodiments, the pore size, porosity, physical dimensions (size), composition and configuration of the plug are such as to vent the helium generated within an RTG into the Martian atmosphere.

Also provided are embodiments which include an absorbent positioned in the vessel. The absorbent reacts with the small amount of atmospheric gases which pass through the plug into the vessel. In preferred embodiments, the absorbent is an alkali metal oxide.

Also provided by this invention are power supplies that generate power from the radioactive decay of plutonium 238 in the presence of thermoelectric couples. The power supply utilizes a microporous plug that will release the helium produced from the protective housing.

DETAILED DESCRIPTION OF THE INVENTION

Figure 1:
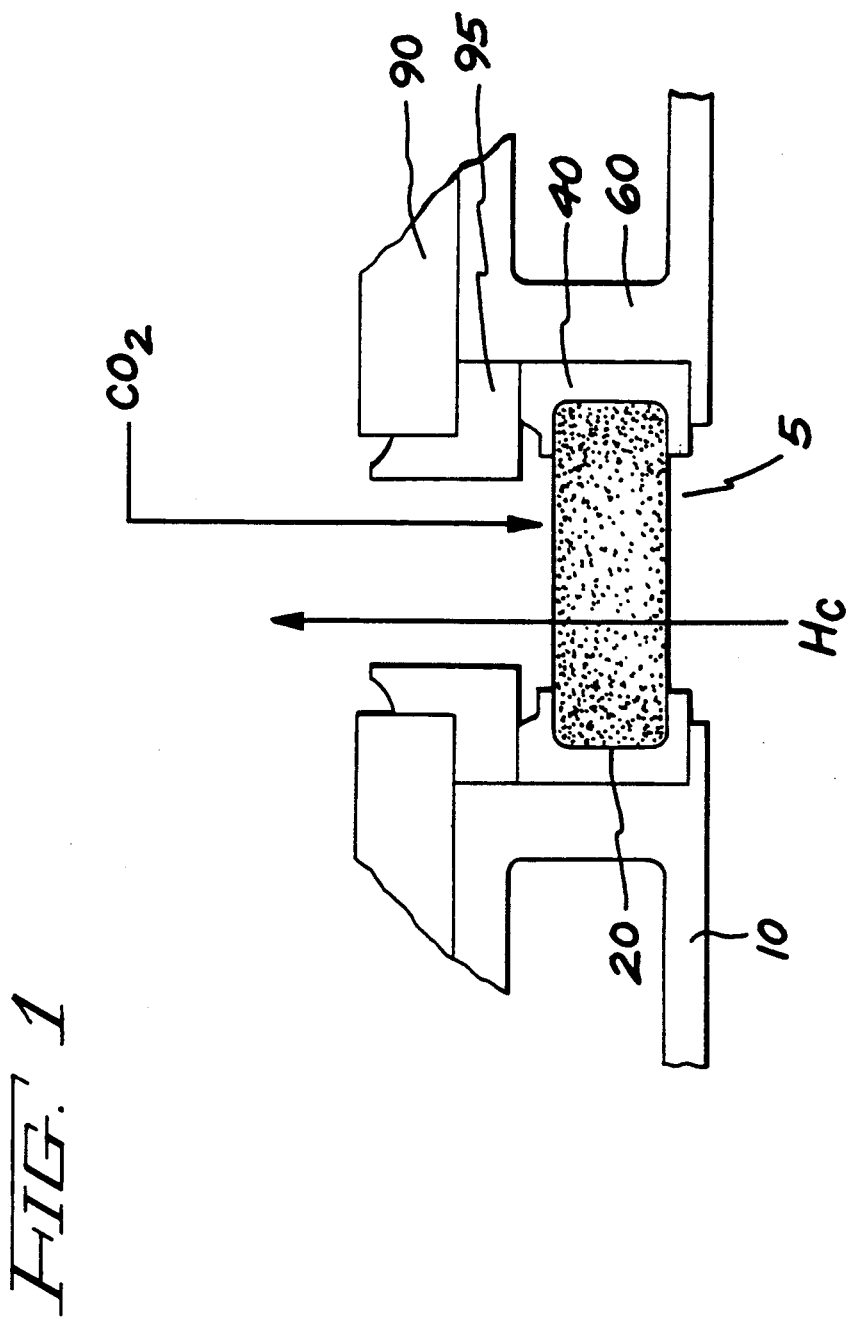
FIG. 1 is a schematic representation of a configuration for an embodiment of this invention wherein a microporous plug is positioned in an outlet of a vessel and an absorber is present in said vessel.

The apparatus of this invention comprises a microporous plug which permits gases to escape from a vessel launched in space, such as the protective housing of an RTG. The plug provides a seal for an outlet of the vessel that restricts the convective flow of gases both in and out once sealed.

The plug has pores of limited size to restrict the bulk flow of gases yet these pores are sufficiently large so that gases may diffuse out of the vessel after sealing. The convective flows are sufficiently restricted to maintain a lower pressure inside the vessel than outside.

The plug can provide for a flow of gas into an atmosphere of higher total pressure, provided the partial pressure of the gas is higher within the vessel than in the surrounding atmosphere. For example, helium within a vessel at a partial pressure of about 1 millibar can be released into the atmosphere of Mars, comprising chiefly carbon dioxide at a total pressure of 6 millibars, since the partial pressure of helium is essentially zero on the Martian surface.

To restrict convective flow and allow for Knudsen diffusion, the pores of the plug must have an average diameter greater than that of the gas molecules and less than the mean free path of the gases within the vessel and in the surrounding atmosphere. If the pores are larger in size, convective flows through the plug will dominate and a pressure differential for these gases will not be maintained across the plug. This is unacceptable if the apparatus is to function in the presence of an atmosphere such as that of Mars.

It is essential to the performance of this invention that the microporous plug serve as a sufficient barrier to convective flow to maintain an adverse pressure differential across the plug for any atmospheric gases and permit a portion of the gas within the vessel to escape by Knudsen diffusion.

If convective flows are found to interfere with the Knudsen diffusion of gases, a reduction in the pore size of the plug will increase its barrier efficiency. The plug's resistance to convective flow can also be improved by utilizing microporous materials having a more consistent pore diameter with fewer deviations from the average size. To minimize the effect of deviations, the average pore size can be maintained well below the mean free path of the flowing gases. However, with such a restriction in pore size, Knudsen diffusion is also reduced. To compensate for the small pore size, the number of pores may be enhanced by increasing the size of the plug or increasing its porosity.

An ideal microporous plug is one which permits only Knudsen diffusion of each component of the gas mixture. If the pores are treated as long thin capillaries, the Knudsen flow for each component i can be approximated by the formula:

$$N^i = 4/3 \, (\delta d/l)(P^i_f - P^i_b) \, (\pi M^i RT)^{-\frac{1}{2}}$$

where "$N^i$" is the molar gas flow rate of gas component "i" per unit area of the plug, "$\delta$" if the fractional open area of the plug (porosity), "d" is the average hole diameter, "l" is the length of the hole (plug thickness), "T" is the absolute temperature, "$M^i$" is the molecular weight, "$P^i_f$" and "$P^i_b$" are the high and low side partial pressures on the plug and "R" is the gas constant. Where the total flow of gas through the plug is significantly different than the calculated Knudsen diffusion, there may be interference from convective flows.

A high pressure differential across the plug will increase convective flows and if sufficiently high, will allow convective flows to dominate over Knudsen diffusion. For example, the high atmospheric pressure of Earth (about 1000 millibars) can provide such a large convective flow of the atmospheric gases into the vessel that the apparatus of this invention will not function properly. Therefore, the embodiments of this invention are better suited to function in vessels launched in space in environments wherein the external pressure is below 1000 millibars. This includes vessels travelling in space and those positioned on the surface of celestial bodies (Mars lander) which have a thin atmosphere. Prior to launch, measures may be taken to protect the vessel contents from the inflow of Earth's atmosphere through the plug.

The advantages of the apparatus are determined by the environment in which it is used. The apparatus is most useful in releasing gases from vessels against a higher total pressure. Gases can be transported from a region of low pressure to a region of high pressure by Knudsen diffusion without the use of a mechanical pump. The apparatus will also release gases to a region of low pressure such as the vacuum of space, but is usually unnecessary in such an environment.

While the apparatus of this invention is capable of releasing any gas from a vessel by Knudsen diffusion, it is most effective in releasing low molecular weight gases such as helium or hydrogen. Gas molecules of low molecular weight will exit a vessel such as an RTG in greater numbers at a given pressure based on the principle that lighter molecules have a higher probability of passing through the holes in the porous plug.

Certain embodiments of this invention are adapted to release helium from a vessel such as an RTG into a surrounding atmosphere of higher molecular weight gases such as carbon dioxide at higher pressure. These embodiments are well suited for operation on the surface of Mars. For such embodiments the microporous plug has a porosity of about 5% to 25%, i.e., from 5% to 25% of the total surface area of the plug comprises pore openings In addition, the pores of the plug for such embodiments must be of a size less than the mean free path of $CO_2$ at the temperature of the plug and the $CO_2$ pressure on the plug. The mean free paths of helium and carbon dioxide will vary with temperature and pressure. The typical temperature range at which an RTG is expected to operate on Mars is from 100° C. to 500° C. The median operating temperature for the plug is expected to be about 250° C. and the average atmospheric partial pressure for carbon dioxide on Mars is about 6 millibars. At about 250° C. and 6 millibars pressure, the mean free path of $CO_2$ is about 16 microns. The microporous plugs with an average diameter of 1 to 6 microns are expected to function well under the conditions on the surface of Mars. An average pore diameter of 2 microns is preferred.

The microporous plug is typically substantially smaller than the RTG. The plug length is usually about 1–10 and preferably about 1–5 cm and the cross sectional area is typically about 1–10 and preferably about 1–5 cm$^2$. The porosity of the microporous plug is most often about 10%. These dimensions are small enough to be well suited for use in space. To utilize a plug on earth, significantly smaller pore sizes are required to prevent significant convective flows.

Where the vessel is a radioisotope thermoelectric generator (RTG) which generates helium from the decay of plutonium 238 dioxide fuel, in preferred embodiments it is necessary for the plug to release helium at a rate equivalent to the rate that helium is generated within the protective housing. This will help maintain a constant partial pressure of helium (usually 1.5 millibars or less) within the vessel. In preferred embodiments the plug is adapted to permit helium to diffuse at a rate of $10^{-7}$ to $10^{-10}$ moles per second at a temperature of about 250° C. and a helium pressure of about 1 millibar. Flow rates in this range are substantially equivalent to the rates at which helium is generated in some RTGs and are indicative of Knudsen flow under these conditions.

Other celestial bodies, such as Earth, have radically different surface conditions (temperature, pressure) and atmospheric gases than those which appear on Mars and may require adjustments to the pore size, porosity, physical dimensions (size) and configuration of the plug to optimize performance. With an increase in the amount of gas released from the vessel by Knudsen diffusion, there is typically an increase in the amount of gas which will enter from a surrounding atmosphere. Therefore, it is preferable to utilize a plug that does not exceed the needs of the system.

The microporous plug may be comprised of high temperature resistant polymers, glass, graphite, a sintered ceramic or a sintered metal. Plugs of a desired pore size can be made by compressing and heating suitable metals or ceramic materials of appropriate micron size particles. Suitable metals include nickel and stainless steel. Suitable ceramics include alumina.

A well designed microporous plug must be strong enough mechanically to withstand any pressure drop across it and have a large number of small diameter holes. The material must be inert in the operating environment of the apparatus and preferably not contain harmful contaminants. In addition, the material used for the plug must be thermally compatible with the vessel wall so that temperature fluctuations do not cause leaks at the interface between the plug and the vessel wall.

When the vessel is in the presence of an atmosphere, the atmospheric gases will also pass through the plug and enter the vessel by Knudsen flow diffusion. Left unchecked, the pressure of such gases in the vessel will increase. In certain embodiments of this invention, the microporous plug is used with an absorber positioned inside the vessel to react with incoming gases. In that the pore size of the plug is effective to facilitate Knudsen flow diffusion, there will always be some inflow of gas from the surrounding atmosphere into the vessel.

The composition of the absorber used will depend on the gas to be absorbed. For example, alkali metal oxides or hydroxides may be used to react with carbon dioxide, the chief constituent of the Martian atmosphere. The amount of absorber used will depend on the amount of gas expected to enter the vessel. Small quantities of lithium oxide are adequate to absorb the carbon dioxide which enters the vessel on the surface of Mars where the plug is configured to maintain a helium partial pressure of 1 millibar within the vessel. For example, about 7-35 grams of lithium oxide are needed to absorb the 10-50 grams of carbon dioxide which enters an RTG through a microporous plug exposed to a partial pressure of 6 millibars of carbon dioxide at a temperature of about 250° C. for a period of about 2 years where the plug maintains the helium partial pressure of about 1 millibar in the RTG.

A suitable configuration for an apparatus of the present invention is shown in FIG. 1. Microporous plug 20 is positioned in the center of outlet 5 within vessel wall 10 and an absorbent (not shown) is also present in the vessel. Only a portion of the vessel wall is shown. Vessel wall 10 is extended at the outlet to provide support 60 for microporous plug 20.

Plug spacer 40 positions microporous plug 20 within outlet 5 and together with microporous plug 20, provides a tight seal for outlet 5. Retainer 90 and assembly spacer 95 secure microporous plug 20 in outlet 5.

Helium gas exits the interior of the vessel through microporous plug 20. Carbon dioxide gas in the surrounding atmosphere passes through microporous plug 20 and subsequently reacts with components of the absorber.

Figure 2:
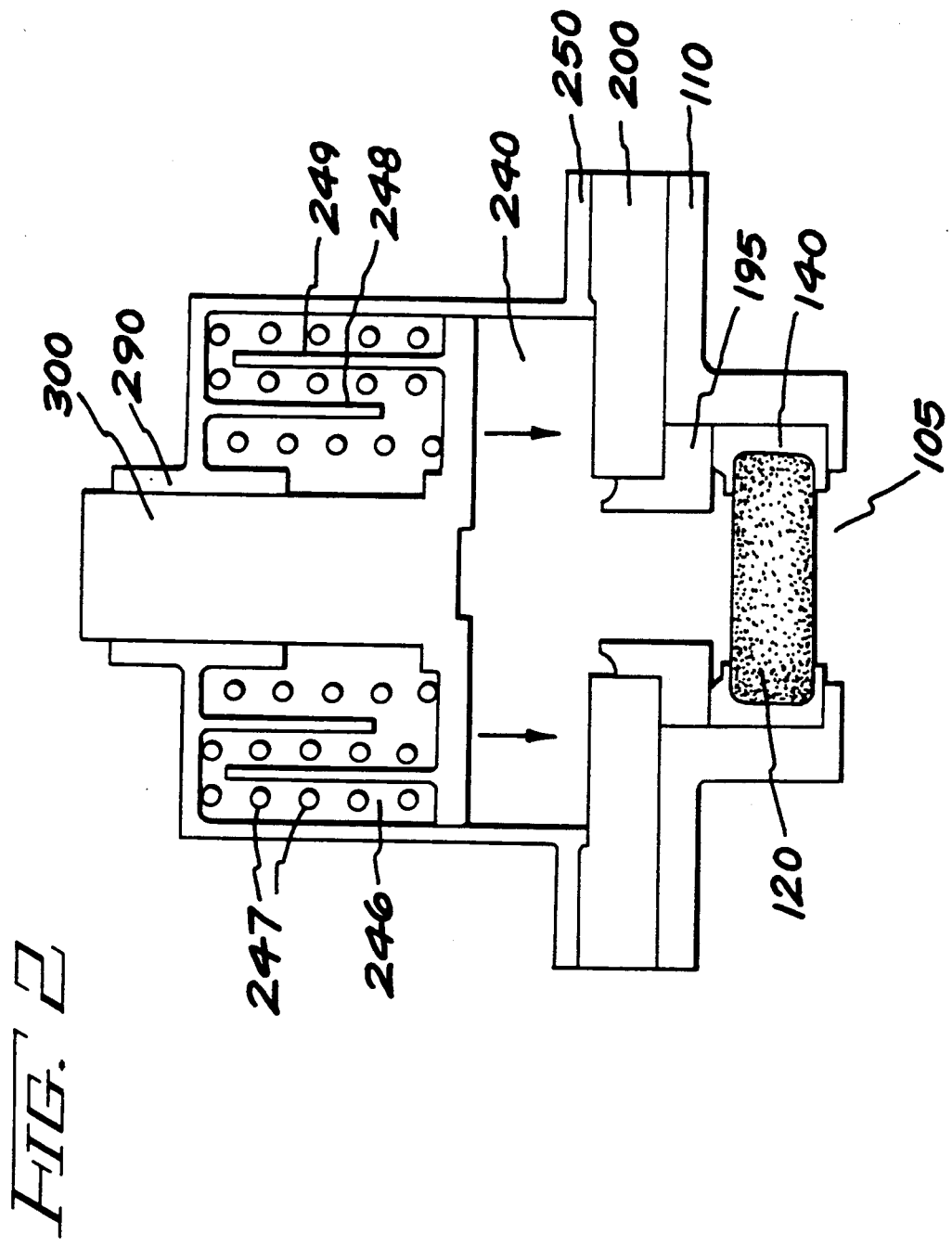
FIG. 2 is a schematic representation of an alternative configuration for an embodiment of this invention wherein a microporous plug is positioned within a pressure relief device to be installed within a vessel outlet.

FIG. 2 illustrates an alternative embodiment wherein the apparatus of the present invention is incorporated into a pressure relief device to be inserted in a vessel outlet.

Microporous plug 120 and plug spacer 140 are positioned in outlet 105 of base 110 to provide a tight seal for outlet 105. Retaining ring 200 and assembly spacer 195 secure microporous plug 120 in base 110. Cap 250 is secured on retaining ring 200 and incorporates guide 290 for plunger 300. Cap 250, retaining ring 200 and base 110 are hermetically sealed and secured by conventional means such as welding, adhering, fastening, etc.

Plunger 300 responds to changes in pressure both with in a vessel and in the environment by travelling along guide 290. The plunger will seal outlet 105 in high pressure environments such as that of Earth to prevent the convective flow of gases through microporous plug 120 prior to launch. Vent holes 247 provide for the passage of atmospheric gases into chamber 246 in high pressure environments to extend the plunger. The plunger retracts in low pressure or vacuum. Retaining member 248 and 249 prevent the plunger from retracting too far so as to cause vent holes 247 to empty into chamber 240. These retaining members are optional Certain embodiments of this invention are directed to power supplies which incorporated a microporous plug to release helium and optionally, an absorber for carbon dioxide gases which enter the power supply. The microporous plug and absorber are as described above. The plug preferably has an average pore size in the range of 1 to 6 microns and is comprised of glass, a sintered ceramic or sintered metal. The absorber is preferably lithium oxide, the amount of which is preferably sufficient to react with 10 to 50 grams of carbon dioxide.

The power supply comprises a vessel which houses a power source of plutonium 238 oxide and thermoelectric elements, preferably silicon-germanium thermoelectric couples. These thermoelectric elements are positioned so as to generate electric power from the heat of decay of plutonium 238.

The vessel also houses the helium product from the decay of plutonium 238. This vessel contains an outlet which is sealed by the microporous plug to provide a pressure differential across the microporous plug. The plug utilized must have pores of sufficient size for the helium decay products to diffuse from the vessel interior.

The vessel preferably has a volume of about $10^3$ to $10^5$ cubic centimeters and the plug is of a physical dimension, configuration, porosity and pore size so as to maintain the helium partial pressure below about 1 millibar.

It will be obvious to those skilled in the art that variations of the above embodiments are possible without departing from the scope of this invention. The microporous plug can have many configurations and it may be positioned within a vessel in a variety of ways. It is intended that such variations be included within the scope of this invention. The invention includes many embodiments which have not been described in the detail provided by the accompanying figures.

What is claimed is:

1. A power supply which comprises:
 (a) a power source comprised of a plutonium 238 fuel and thermoelectric elements positoned so as to generate electric pwer from the heat of decay of plutonium 238;
 (b) a housing for said power source and the helium produced from the radioactive decay of plutonium 238, said housing having an outlet;
 (c) a microporous plug installed in said outlet so as to provide a seal which maintains a helium pressure differential across said microporous plug, said plug having parameters consisting of porosity, pore size, physical dimensions, configuration and composition to provide, when installed in said outlet, for Knudsen diffusion of helium from said housing into an environment of higher total pressure than the pressure with said housing, under conditions approximating those on the surface Mars; and
 (d) an absorbent which reacts with carbon dioxide entering said housing.

2. A power supply as in claim 1 wherein the pores of said microporous plug have an average diameter of about 1-6 microns at a temperature of about 250° C.

3. A power supply as in claim 1 wherein the microporous plug comprises a material selected from the group consisting of glasses, high temperature resistant polymers, sintered ceramics, sintered metals and graphite.

4. A power supply as in claim 1 wherein the absorbent is an alkali metal oxide or hydroxide.

5. A power supply as in claim 4 wherein the absorbent is lithium oxide.

6. A power supply as in claim 5 wherein the lithium oxide is present in an amount of about 7-35 grams.

7. A power supply as in claim 5 wherein the lithium oxide is present in an amount sufficient to react with 10-50 grams of carbon dioxide.

8. A power supply as in claim 1 wherein said housing has an internal volume of about $10^3$ to $10^5$ cubic centimeters, the plutonium 238 fuel generates helium at a rate of about $10^{-7}$ to $10^{-10}$ moles per second and said parameters are selected to provide a helium partial pressure within the housing below about 1.5 millibars.

9. A power supply as in claim 1 further comprising means for sealing said housing in environments wherein the pressure differential between the interior and exterior of said housing is about 1000 millibars or above.

10. A power supply as in claim 1 wherein said parameters are selected to provide for Knudsen diffusion of helium at ar ate substantially equivalent to the rate at which said helium is generated by said plutonium 238.

11. A power supply as in claim 1 wherein said parameters are selected to provide for a helium partial pressure within the housing below 1 millibar.

12. A power supply as in claim 1 wherein said parameters are selected to provide for diffusion of helium from said housing at a rate of about $10^{-7}$ to $10^{-10}$ mole per second at a helium pressure differential across said microporous plug of about 1 millibar and a temperature of about 250° C.

* * * * *

UNITED STATES PATENT AND TRADEMARK OFFICE
CERTIFICATE OF CORRECTION

PATENT NO. : 5,057,160

DATED : October 15, 1991

INVENTOR(S) : William J. Ward, III, Philip G. Kosky and John A. Kamal

It is certified that error appears in the above-identified patent and that said Letters Patent is hereby corrected as shown below:

Figure 1, bottom of figure, "$H_c$" should read --He--.
Column 8, line 53, "hydrozide" should read --hydroxide--.

Signed and Sealed this

Sixth Day of April, 1993

Attest:

STEPHEN G. KUNIN

*Attesting Officer*     Acting Commissioner of Patents and Trademarks